United States Patent
Kalker et al.

(10) Patent No.: US 7,523,312 B2
(45) Date of Patent: Apr. 21, 2009

(54) FINGERPRINT DATABASE UPDATING METHOD, CLIENT AND SERVER

(75) Inventors: Antonius Adrianus Cornelis Maria Kalker, Eindhoven (NL); Jaap Andre Haitsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 672 days.

(21) Appl. No.: 10/495,283

(22) PCT Filed: Oct. 24, 2002

(86) PCT No.: PCT/IB02/04467

§ 371 (c)(1),
(2), (4) Date: May 12, 2004

(87) PCT Pub. No.: WO03/042867

PCT Pub. Date: May 22, 2003

(65) Prior Publication Data

US 2005/0004941 A1 Jan. 6, 2005

(30) Foreign Application Priority Data

Nov. 16, 2001 (EP) .................................. 01204389

(51) Int. Cl.
*G06F 7/00* (2006.01)
(52) U.S. Cl. ............................. 713/176; 707/10; 707/2; 707/101; 707/3; 709/205; 709/201
(58) Field of Classification Search .............. 707/104.1, 707/3; 348/598; 386/109, 125, 46; 382/195, 382/239, 236
See application file for complete search history.

(56) References Cited

U.S. PATENT DOCUMENTS

| | | | | |
|---|---|---|---|---|
| 5,347,308 A | * | 9/1994 | Wai | 375/240.23 |
| 5,410,343 A | * | 4/1995 | Coddington et al. | 725/99 |
| 5,870,754 A | * | 2/1999 | Dimitrova et al. | 707/104.1 |
| 5,892,900 A | * | 4/1999 | Ginter et al. | 726/26 |
| 6,088,717 A | * | 7/2000 | Reed et al. | 709/201 |
| 6,415,280 B1 | * | 7/2002 | Farber et al. | 707/2 |
| 7,165,071 B2 | * | 1/2007 | Fanning et al. | 707/10 |
| 2002/0033844 A1 | * | 3/2002 | Levy et al. | 345/744 |

(Continued)

OTHER PUBLICATIONS

Robinson, Sara "Can Napster block infringement?" ZDNET India News, 'Online!, 24 Nov. 24, 2000, pp. 1-4, XP002265417.

(Continued)

*Primary Examiner*—Kambiz Zand
*Assistant Examiner*—Yonas Bayou

(57) ABSTRACT

A method of updating a database (211) comprising a fingerprint of and an associated set of metadata for each of a number of multimedia objects, A multimedia object and a set of metadata for the multimedia object is downloaded from a file sharing client (101-105). A fingerprint is computed from the multimedia object, and the computed fingerprint and the obtained set of metadata are included in the database (211). The database (211) can be maintained by a central server (210), or be maintained in a distributed fashion by servers (404) running on the file sharing clients (101-105). The database (211) in this way accumulates plural sets of metadata associated with one particular fingerprint. When a sufficient number of sets has been collected, a definite set can be determined using filtering techniques.

8 Claims, 3 Drawing Sheets

U.S. PATENT DOCUMENTS

| | | | |
|---|---|---|---|
| 2002/0049760 A1* | 4/2002 | Scott et al. | 707/10 |
| 2002/0052885 A1* | 5/2002 | Levy | 707/200 |
| 2002/0138576 A1* | 9/2002 | Schleicher et al. | 709/205 |
| 2003/0061287 A1* | 3/2003 | Yu et al. | 709/205 |
| 2005/0021394 A1* | 1/2005 | Miedema et al. | 705/14 |
| 2006/0149806 A1* | 7/2006 | Scott et al. | 709/201 |

OTHER PUBLICATIONS

Streamingedia.com / Emusic and Relatable Team to Offer Open Source Audio Recognition Solution, by Ellie Kieskowski, Oct. 17, 2000 XP-002258235—www.streamingmedia.com/article.asp?id=6.

* cited by examiner

FINGERPRINT DATABASE UPDATING METHOD, CLIENT AND SERVER

The invention relates to a method of updating a database comprising a fingerprint of and an associated set of metadata for each of a number of multimedia objects. The invention further relates to a file sharing client, a server arranged for updating such a database, and to a file sharing network comprising at least one file sharing client and at least one server.

Fingerprints of human beings are already used for over a hundred years to identify people. Conceptually a fingerprint can be seen as a short summary, which is unique for every single human being. Recently a growing interest is seen in the field of multimedia processing to compute fingerprints of multimedia objects. In order to qualify two multimedia objects as the same, instead of comparing the multimedia objects itself, only their fingerprints are compared. A fingerprint of a multimedia object is a representation of the most relevant perceptual features of the object in question. Such fingerprints are sometimes also known as "(robust) hashes".

In most systems using fingerprinting technology, the fingerprints of a large number of multimedia objects along with their associated respective metadata are stored in a database. The term "metadata" refers to information such as the title, artist, genre and so on for a multimedia object. The metadata of a multimedia object is retrieved by computing its fingerprint and performing a lookup or query in the database using the computed fingerprint as a lookup key or query parameter. The lookup then returns the metadata associated with the fingerprint.

There are several advantages in storing fingerprints for multimedia objects in a database instead of the multimedia content itself. To name a few:
1. The memory/storage requirements for the database are reduced.
2. The comparison of fingerprints is more efficient than the comparison of the multimedia objects themselves, as fingerprints are substantially shorter than the objects.
3. Searching in a database for a matching fingerprint is more efficient than searching for a complete multimedia object, since it involves matching shorter items.
4. Searching for a matching fingerprint is more likely to be successful, as small changes to a multimedia object (such as encoding in a different format or changing the bit rate) does not affect the fingerprint.

An example of a method of generating a fingerprint for a multimedia object is described in European patent application number 01200505.4, as well as in Jaap Haitsma, Ton Kalker and Job Oostveen, "Robust Audio Hashing For Content Identification", International Workshop on Content-Based Multimedia Indexing, Brescia, September 2001.

Apart from the technical challenges in engineering such a system, there is also the problem of collecting the multimedia objects, or at least their fingerprints, to be put in the database. For example, in the case of audio music, it is possible to go out to Tower Records, buy 100,000 CDs and compute fingerprints directly from the CD. Apart from the fact that this is an expensive operation, this solution suffers from several other drawbacks.

Firstly, buying CDs is a manual operation, which is difficult to automate. In particular it means that keeping the database with fingerprints up-to-date is difficult to automate. Secondly, one might not always be interested in CD quality, but also in degraded quality if that is more appropriate to the application. This would imply an additional pre-processing step before fingerprints can be put in the database. Also, one must obtain the metadata for all the songs for which fingerprints are stored in the database. This is an even greater challenge than obtaining the fingerprints themselves.

The U.S. company Relatable.com markets a digital music player which "learns" music preferences based on the music played, and creates virtual communities of people who share similar music preferences. To learn these preferences, the music player searches the user's computer for music files, and creates fingerprints for all of them. The fingerprints are then submitted to a central server, where they are matched against a database with metadata provided by Relatable.com. Information on Relatable.com's system is available at the time of writing on the Internet at http://relatable.com/tech/player.html.

The Relatable.com system expects that metadata obtained from the user's computer may be incorrect (quote: "If you recorded your music files from your CD collection, the metadata (information such as album title, artist or song name) may be inaccurate.") and so this metadata is not read by the music player. Rather, Relatable.com substitutes its own metadata for fingerprints received from users, so that they can be easily compared and processed. A disadvantage of this system is thus that Relatable.com must obtain its own metadata for all songs for which it receives fingerprints from all the clients.

It is an object of the invention to provide a method according to the preamble, which is more efficient than the known method.

This object is achieved according to the invention in a method comprising obtaining a multimedia object and a set of metadata for the multimedia object over a network from a file sharing client connected to the network, computing a fingerprint from the multimedia object, and including the computed fingerprint and the obtained set of metadata in the database.

Using this method, it is no longer necessary to actively go out and buy content e.g. on CD, or to find out the metadata for content yourself. By exploiting the objects and the metadata available from the fife sharing clients on the network, signatures and metadata can be collected in a very efficient way. These clients already make the objects available for anyone to download, so buying these objects becomes unnecessary. Further, typically THE objects are made available together with metadata, so this metadata can be used as well.

In an embodiment the step of including the fingerprint and the set of metadata comprises receiving the computed fingerprint and the obtained set of metadata in a server, determining whether the computed fingerprint is present in the database, and if so, associating the obtained set of metadata with said fingerprint, and if not, adding the computed fingerprint and the obtained set of metadata, associated with each other, to the database.

Collecting the fingerprints and sets of metadata in a database maintained by a server has the advantage that there is one single location from which all the metadata is available. After a number of fingerprints and sets of metadata have been included in the database, the central server can make the contents of the database available, so that anyone can submit a query with a fingerprint and receive the appropriate metadata in return.

In a further embodiment the server further determines a definite set of metadata associated with a particular fingerprint once a sufficient number of sets of metadata are associated with said particular fingerprint in the database.

The sets of metadata associated with one particular fingerprint have been obtained from different clients. It is to be expected that not everyone will supply the correct metadata for all multimedia objects that he shares, for a variety of reasons. It is, however, desirable to have one definite set with the correct metadata associated with one particular fingerprint. Once a sufficient number of sets of metadata are available in the database, it becomes possible to apply a filtering mechanism to determine the correct metadata.

In a further embodiment the method further comprises supplying the definite set of metadata to at least one client from which a set of metadata associated with the particular fingerprint was previously obtained. This way, those clients can update their metadata for the song in question. By providing feedback in this fashion, the server provides a useful service to the clients on the file sharing network.

The invention further provides a file sharing client arranged for updating a database comprising a fingerprint of and an associated set of metadata for each of a number of multimedia objects, comprising means for obtaining a multimedia object and a set of metadata for the multimedia object over a network from a further file sharing client connected to the network, computing a fingerprint from the multimedia object, and means for including the computed fingerprint and the obtained set of metadata in the database.

The invention further provides a server arranged for updating a database comprising a fingerprint of and an associated set of metadata for each of a number of multimedia objects, comprising networking means for receiving a computed fingerprint and a set of metadata, verifying means for determining whether the computed fingerprint is present in the database, and if so, associating the obtained set of metadata with said fingerprint, and if not, adding the computed fingerprint and the obtained set of metadata, associated with each other, to the database.

In an embodiment the server further comprises filtering means for determining a definite set of metadata associated with a particular fingerprint once a sufficient number of sets of metadata are associated with said particular fingerprint in the database.

In a further embodiment the server is further arranged for supplying the definite set of metadata to at least one client from which a set of metadata associated with the particular fingerprint was previously obtained.

The invention also relates to a file sharing network comprising at least one file sharing client according to the invention and at least one server according to the invention.

These and other aspects of the invention will be apparent from and elucidated with reference to the embodiments shown in the drawing, in which:

FIG. 1 schematically shows a file sharing network comprising plural clients;

FIG. 2 schematically shows a network crawler connected to a server;

Throughout the figures, same reference numerals indicate similar or corresponding features. Some of the features indicated in the drawings are typically implemented in software, and as such represent software entities, such as software modules or objects.

Figure 1:
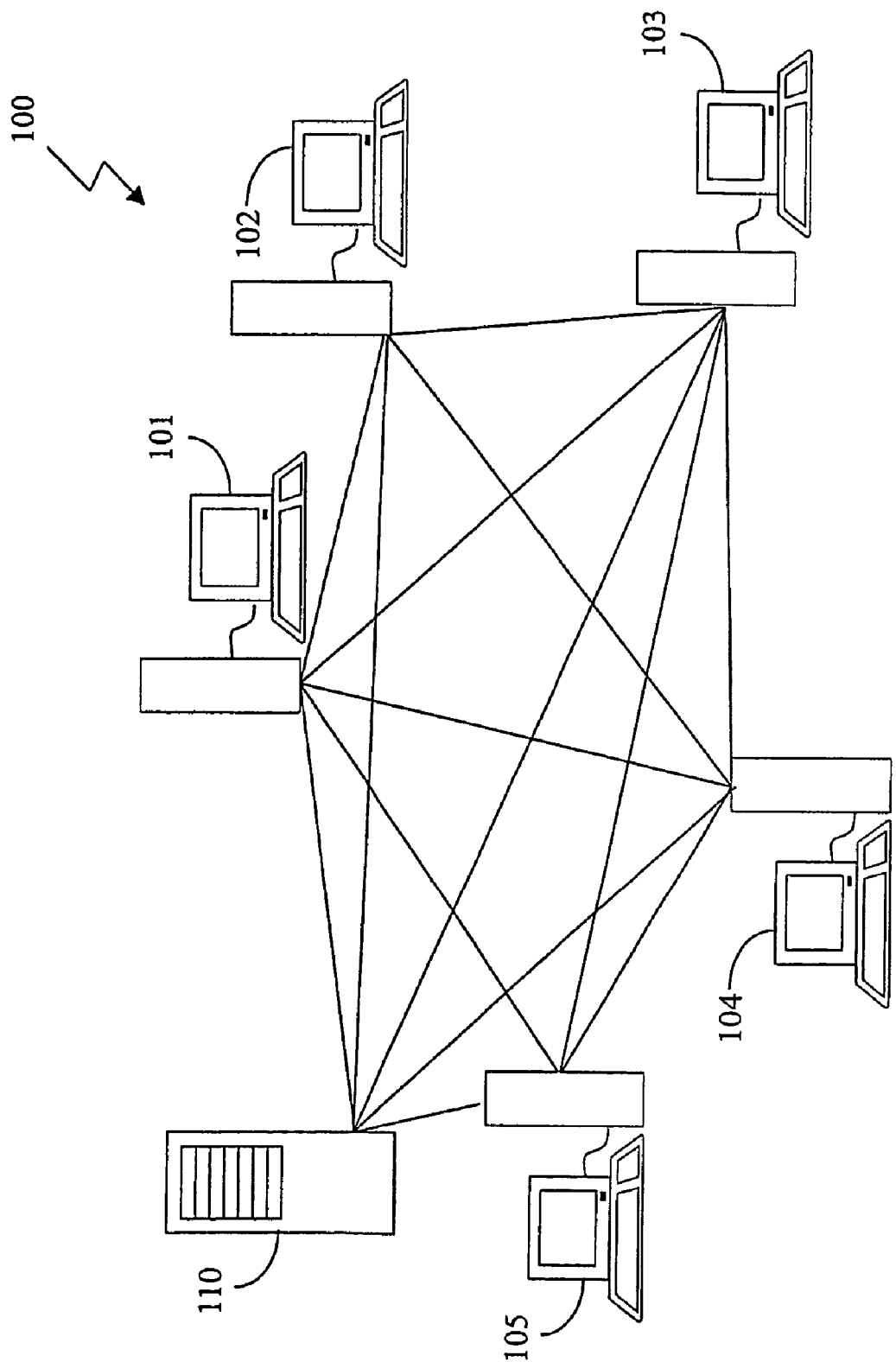

FIG. 1 schematically shows a file sharing network 100 comprising plural file sharing clients 101, 102, 103, 104 and 105. Although shown here as a physical network, with direct connections between the clients 101-105, the network 100 is best regarded as a conceptual or virtual network. That is, it is not necessary that all clients 101-105 are physically or network-wise directly connected to each other all the time. All that is needed is that one client "on the network" can obtain files or objects from another client. Also, even when direct client-to-client connections are used, it is not necessary that all clients are connected to all other clients.

The network 100 may comprise a server 110, which performs a directory service for the clients 101-105. To connect to the file sharing network 100, a client 101 submits a list of the files (or objects) it wants to share to the server 110. The server 110 combines the lists it receives from all the clients connected to the network 100. Other clients 102-105 can then connect to the server 110 and browse the combined list or search for specific objects on the list. They can subsequently contact the client that has the object they are looking for, and obtain (download) it from that client directly. This way, the server 110 does not directly participate in the sharing of files or objects between the clients 101-105. This approach is well known in the worldwide Napster file sharing network.

It is also possible to realize the network 100 without the server 110. In that case, a client 101 connects to the network 100 by connecting to one or more other clients 102-105 that are already on the network 100. A client searches the network by sending a search request to the clients it is connected to. These clients examine their list of objects which they share, and return a result if the requested object is in that list. Furthermore, the request is forwarded to other clients connected to these clients. This way, the request is distributed throughout the entire network 100 until it is received by a client which can fulfill it, or until all clients have received it and none are able to fulfill it.

Such an embodiment is known from e.g. the Gnutella file sharing network. A disadvantage of this embodiment is that the network 100 is not scalable. Gnutella like networks currently for example cannot support 1 million clients. Furthermore the network becomes slow if there are a number of "slow" computers, i.e. computers with limited bandwidth to the network 100, processing power and/or memory.

Alternatively the client 101 can, after connecting to the one or more other clients 102-105, submit its list of files or objects it wants to share to those other clients 102-105. The list is then passed on to all the clients on the network 100. This way, all clients know which clients have which files or objects available, and can contact that client directly.

The known KaZaa file sharing network also operates without a server 110, but to overcome the above-mentioned problem uses two types of clients: a super node and a "normal" client. Super nodes are clients which have sufficient bandwidth, processing power and memory. A normal client connects to the network by connecting to a super node and sends the list of the files to be shared to the super node. A super node has connections to a number of clients and furthermore is also connected to a number of other super nodes.

A super node is at the same time also a normal client. That is, for the user the fact that his computer is a super node is transparent. When a user wants to search for a file, his client sends a request to the super node to which his client is currently connected. The super nodes returns the matching files, that are in the lists send by its clients. Furthermore the super node forwards the request to all the super nodes to which it is connected in a fashion similar to the one described above in the Gnutella embodiment. However, since the connections between super nodes have a large bandwidth this approach is much faster than the Gnutella networks. Furthermore it can be scaled up to millions of clients.

Such file sharing networks, typically referred to as peer-to-peer or P2P file sharing networks, have an enormous popularity. Well known examples of these networks are: Napster, Musiccity, Gnutella, Kazaa, Imesh and Bearshare. Once users have installed the appropriate client software on their personal computers, they can share their files and they are able to download files shared by other users. The clients 101-105 may be connected to a network such as the Internet, which facilitates the establishment of the file sharing network 100. A client could e.g. use a direct TCP/IP connection to another client to obtain a file or object.

On the most popular networks, usually over 500,000 people are connected simultaneously. At the time of writing, people are mostly sharing music files (often in the MP3 format), but the sharing of movies is gaining popularity. The term "multimedia object" will be used to denote files containing music, songs, movies, TV programs, pictures and the likes. It is to be noted that a multimedia object may be made up of several different files.

Figure 2:
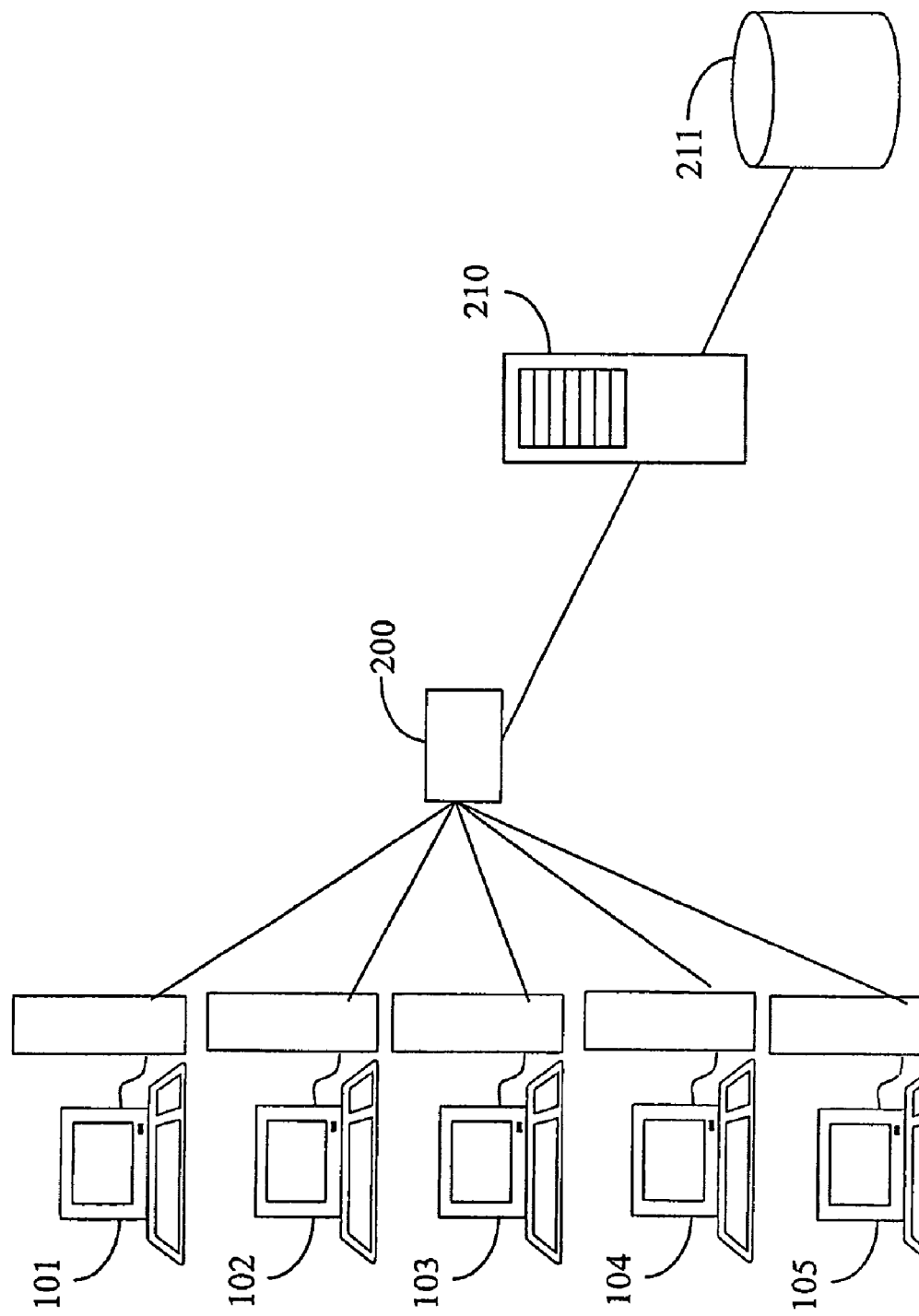

FIG. 2 schematically illustrates a network crawler 200 connected to a server 210. The crawler 200 is arranged to obtain the multimedia objects that the clients 101-105 are sharing over the file sharing network 100. This is known in the art as "crawling", and an entity performing the act of crawling therefore is known as a "crawler". The crawler 200 can to this end be connected to the file sharing network 100. It could also contact the server 110 to obtain a list of all the available multimedia objects, and then directly access all the individual clients 101-105 to download all the available multimedia objects.

When crawling a network, care must be taken to avoid overloading the network 100 and/or individual nodes on the network 100. When a particular client makes a large number of objects available for sharing, the crawler 200 might try to download all the objects in a very short time. This introduces a serious risk of overloading the network connection of the particular client, and may result in the crawler 200 being denied access to the file sharing network 100.

The crawler 200 also obtains a set of metadata for the multimedia object from the client from which it obtains the multimedia object itself. Often this set of metadata is included in or with the multimedia object, so that obtaining the set of metadata is done automatically when obtaining the multimedia object. For instance, a multimedia object with music in the popular MP3 format often contains metadata as an ID3 'tag' at the end of the object.

Having downloaded a multimedia object, the crawler 200 then computes a fingerprint from the multimedia object. As mentioned above, one method for computing a fingerprint is described in European patent application 01200505.4, although of course any method for computing a fingerprint can be used.

The crawler 200 can alternatively be realized as a hardware or software modules installed on one or more of the clients 101-105, for example as a plug-in module in the file sharing software running on the clients 101-105. The crawler 200 can then simply obtain the multimedia objects by accessing them on the shared drives or directories, without having to download them over the network. The set of metadata for the multimedia object can similarly be obtained by simply reading it from the multimedia object on the shared drives or directories.

Computing the fingerprint can also be performed on the client 101-105. As computing a fingerprint for multimedia object may be CPU-intensive, care must now be taken to avoid consuming too much CPU power. Doing so might upset the user of the file sharing software as he sees it interferes with his normal use of the system.

The fingerprint can be computed upon user request or alternatively in the background. In the latter case, it is preferred to periodically scan the shared drives or directory for new multimedia objects for which no fingerprint has been computed yet. If any such objects are found, a fingerprint is computed automatically. If no metadata is available for such an object, the user could be prompted to enter a set of metadata.

In any case, once the crawler 200 has computed a fingerprint for a multimedia object, and has obtained a set of metadata for the multimedia object, it includes fingerprint and set of metadata in a database 211. This database 211 can be maintained by a central server 210, as shown in the embodiment of FIG. 2. The database can alternatively be maintained in a distributed fashion, as will become apparent with reference to FIG. 4 below.

Figure 3:
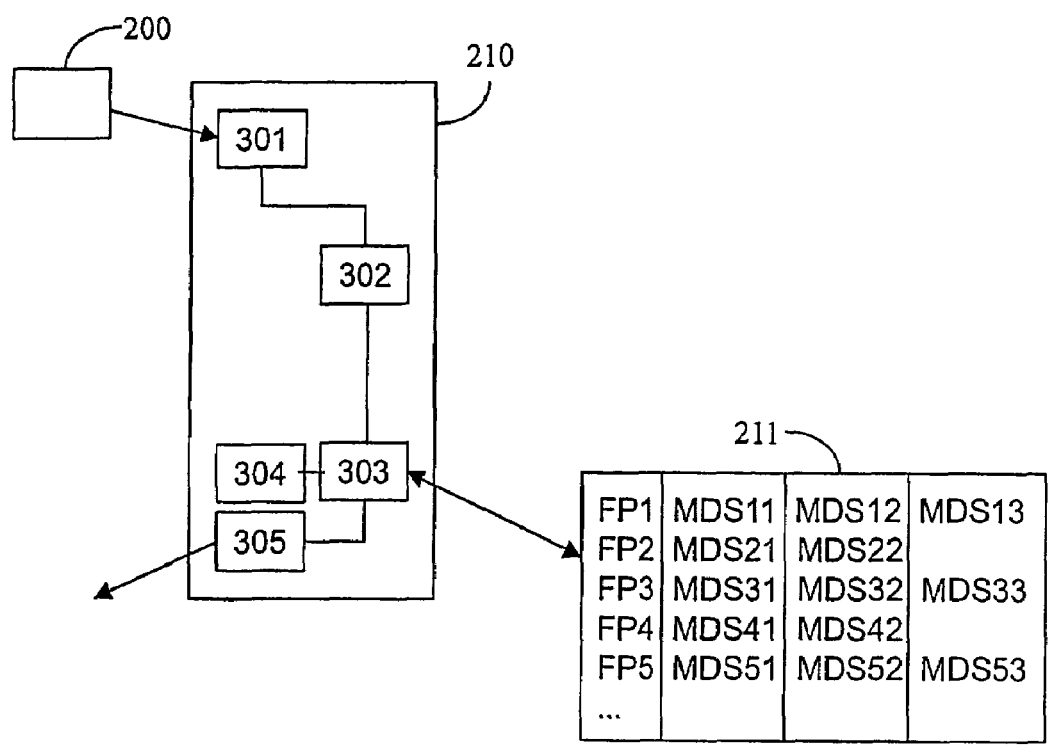
FIG. 3 shows the server in more detail.

FIG. 3 shows the server 210 in more detail. In this embodiment, it is the server 210 that maintains the database 211. The crawler 200 now submits the computed fingerprint and the obtained set of metadata to the server 210 for inclusion in the database 211. A networking module 301 in the server 210 receives the fingerprint and set of metadata. A verifying module 302 checks whether the received fingerprint is already present in the database 211, preferably by submitting a query to a Database Management System (DBMS) backend module 303 which resolves the query, retrieves the results from the database 211 and returns those to the verifying module 302.

If the received fingerprint is already in the database 211, the verifying module 302 submits the set of metadata to the DBMS backend module 303, which updates the database 211 to associate the set of metadata with the fingerprint already in the database 211. If the received fingerprint is not already in the database 211, the verifying module 302 submits the computed fingerprint and the obtained set of metadata to the DBMS backend module 303 which adds the fingerprint and the set of metadata, associated with each other, to the database 211.

The database 211 comprises fingerprints FP1, FP2, FP3, FP4, FP5 and respective associated sets of metadata. In the example given in FIG. 3, fingerprint FP1 is associated with sets MDS11, MDS12, and MDS13. Fingerprint FP2 is associated with sets MDS21 and MDS22. Fingerprint FP3 is associated with sets MDS31, MDS32, and MDS33. Fingerprint FP4 is associated with sets MDS41 and MDS42, and finally fingerprint FP5 is associated with sets MDS51, MDS52, and MDS53.

At some point in time the database 211 will contain a plurality of sets of metadata associated with one particular fingerprint. These sets of metadata have been obtained from different clients 101-105. It is to be expected that not everyone will supply the correct metadata for all multimedia objects that he shares, for a variety of reasons. It is, however, desirable to have one definite set with the correct metadata associated with one particular fingerprint.

As long as there are only one or two sets of metadata associated with a particular fingerprint, it is very difficult to determine which of these sets contains the correct metadata. However, when a sufficient number of sets is collected for one particular fingerprint, an automated process can be used to elect a definite set. To this end, the server 210 is provided with filtering module 304 which is arranged to determine a definite set of metadata associated with a particular fingerprint once a sufficient number of sets of metadata are associated with said particular fingerprint in the database 211.

For example, suppose that the database 211 contains the following sets of metadata associated with one particular fingerprint:
1. (artist="Jewwel", title="Hands")
2. (artist="Jewel", title="Hands")
3. (artist="Jewel", title="Hnds")
4. (artist="Jewel", title="Hands")
5. (artist="Jewel", title="Hands")

It can easily be seen that in this example four out of five sets give the name of the artist as "Jewel", while only one gives the name as "Jewwel". Using the simple approach that the majority wins, the definite set of metadata would give the name of the artist as "Jewel". Similarly, four out of five sets give the title of the song as "Hands", and so the definite set of metadata would also give the title of the song as "Hands". The same approach can of course be used for other types of metadata included in the sets, such as album title, publication year, genre, URL for the artist's Website and so on.

Other, more advanced techniques for automatically determining a definite value from a plurality of candidate values can of course also be used. Such techniques are common in the field of intelligent agents, where they are used to eliminate noise from information received by an agent. They include decision tree pruning and cross validation. What exactly constitutes a "sufficient number" depends on the technique used. When using majority voting, having at least five sets of metadata produces satisfactory results.

It is observed that not all sets of metadata are necessarily complete. For example, one set of metadata might contain only the title and the name of the artist for a particular song, while another might also contain the title of the album from which the song was obtained and the year of publication of the album. So the above process should be performed on the individual types of metadata, e.g. once for the title based on all the available titles, once for the artist's name based on all the available artist names, once for the year of publication, and so on. This way, a definite set of metadata is obtained which is as extensive as possible, i.e. which includes not only title and artist but also album title and publication year. Such an extensive definite set of metadata is the most valuable.

Once the definite set of metadata has been determined and associated with a particular fingerprint, the other sets of metadata associated with that particular fingerprint could be deleted from the database 211. This reduces the size of the database 211. It is of course also possible to continuously run a background check on the sets of metadata. For example, some metadata, such as genre classification, are not constant over time.

It is possible to track in the server 210 from which clients a particular fingerprint was obtained. Once the definite set of metadata for that particular fingerprint has been determined, the definite set of metadata can be fed back to those clients, or only to those clients from which a set of metadata was obtained that did not correspond to the definite set of metadata. This way, those clients can update their metadata for the song in question. This is a tool that can be used to provide an incentive to allow metadata generation using users clients.

The server 210 can make at least a portion of the database 211 available to others. The server 210 can make this portion available e.g. by offering a search interface 305 through which clients can submit a fingerprint and receive a set of metadata in return. Preferably only the definite set of metadata associated with the submit a fingerprint is returned. If no definite set of metadata is available, the server 210 could return all the sets of metadata associated with the submitted fingerprint, or report that no definite answers can be given to the search.

Various methods of retrieving from the database a set of metadata associated with the submitted fingerprint are known from the above-mentioned European patent application 01200505.4, as well as from European patent applications 01202720.7 and European patent application 01202959.1. Other methods can of course also be used.

The contents of the database 211 can be made available for free, or only to paying subscribers. Alternatively, a fee could be charged for every query performed on the database. The amount of metadata returned to the client in response to submitting a fingerprint could also be varied: the free service returns only artist and title, and the subscription-based service returns all the metadata available in the database, for example.

Figure 4:
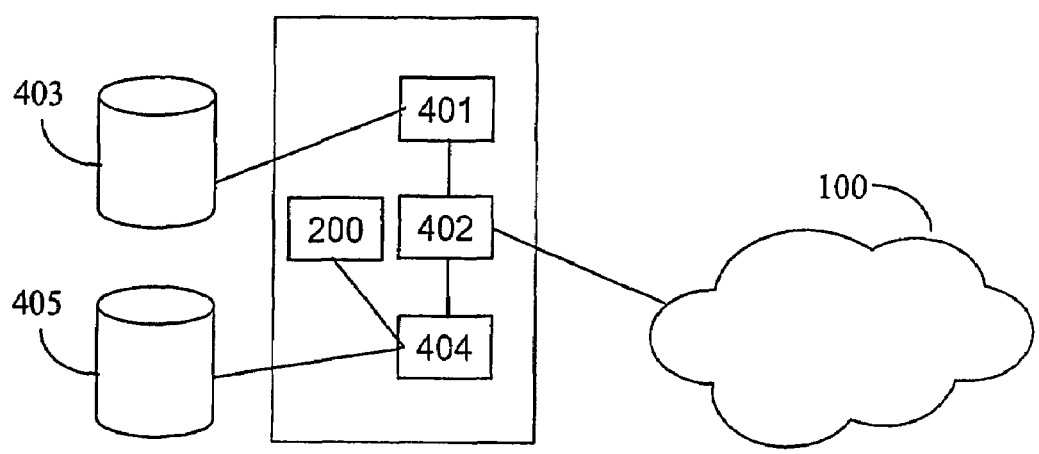
FIG. 4 shows a file sharing client in more detail.

FIG. 4 shows the file sharing client 101 in more detail. As mentioned above, it is also possible to maintain the database with fingerprint and sets of metadata in a distributed fashion. This obviates the need for a server such as server 210. The functionality necessary for maintaining the database then needs to be realized in whole or in part in one or more of the file sharing clients 101-105.

The file sharing client 101 is preferably realized as a personal computer on which file sharing software 401 is running, as is well-known in the art. The file sharing software 401 typically makes use of a networking module 402, such as the TCP/IP stack available in modem operating systems. A storage 403 contains one or more multimedia objects which are shared by the file sharing software 401. Such a storage 403 would typically be a directory on a hard disk. In some cases, the storage 303 may contain a separate portion in which downloaded multimedia objects are stored. This portion, typically also a directory, is not necessarily the same as the directory in which multimedia objects to be shared are stored.

In accordance with this embodiment of the invention, the file sharing client 101 also comprises a fingerprint server 404. This server 404 maintains a fingerprint database 405, in a way similar to the server 210 of FIG. 3. The database 405 can be constructed and maintained very easily if the fingerprints stored in it are obtained from the multimedia objects that are shared in storage 403. This can be realized by implementing the crawler 200 as a hardware or software modules installed on the file sharing client 101, as was explained above with reference to FIG. 2.

The database 405 will contain fingerprints and associated sets of metadata just like database 211, although because of the distributed nature of this embodiment the contents of the database 405 will most likely be smaller than the contents of the database to 11. The database 405 will typically contain for each shared multimedia object a fingerprint and one associated set of metadata, unless of course the storage 403 contains multiple copies of one particular multimedia object. Additionally, the database 405 could be extended with fingerprints and metadata for multimedia objects downloaded by the file sharing client 101 from other file sharing clients on the network 100.

A fingerprint for a multimedia object can be computed while that object is being downloaded, since only a relatively small portion of the object is necessary to compute a fingerprint. If the metadata for that object is available as well, the fingerprint and metadata can be included in the database 405 before the object is downloaded completely. If during this process it is determined that the fingerprint is already in the database 405, it is very likely that the user already has a copy of this particular multimedia object in his possession. The user could then be warned, so that he can abort the downloading.

When a client 101 is downloading a multimedia object from another client 102, the client 101 can also download one or more fingerprints with associated sets of metadata from the client 102. These fingerprints are relatively small (in the order of ten kilobytes, as opposed to several megabytes for a typical multimedia object) and so will not affect the performance of the client 101. This provides a way to distribute the database with fingerprints and metadata in an arbitrary fashion over the clients 101-105 in the network 100. It is now possible to distribute the database over the clients 101.

In the KaZaa file sharing network, the super nodes are preferably used to distribute fingerprints and metadata over the network 100. In a network like the Napster file sharing network, it could be the central server that distributes the fingerprints.

Obtaining the right metadata can also be assisted by super nodes or central servers. A client submits a search request for a particular fingerprint to the super node to which it is connected. The super node passes on the request to the other super nodes. Without a central server that filters the sets of metadata in the database to determine a definite set, the super node would probably receive multiple answers to the query. The super node can then apply majority voting or another technique, as explained above, to determine a definite set of metadata which is then supplied back to the client that submitted the request.

The super node could subsequently update its own database 405 with the definite set, so as to avoid having to pass on the query again to all the other super nodes every time one of his clients submits that query again. However, this runs the risk that his information will be outdated at some time.

The size of the fingerprint server 404, i.e. the portion of the distributed database 405 that it maintains, could be made dependent on the performance of the personal computer on which it is running. For example, bandwidth restrictions, CPU speed and/or available working memory (RAM) could be taken into account. This way, a slow computer would not be burdened with a large fingerprint server.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of updating a database comprising a fingerprint of and an associated set of metadata for each of a number of multimedia objects, the method comprising:
    obtaining a multimedia object and a set of metadata for the multimedia object over a network from a file sharing peer-to-peer client connected to the network;
    computing a fingerprint from the multimedia object, and including the computed fingerprint and the obtained set of metadata in the database;
    determining whether the computed fingerprint is present in the database, and selecting one of: associating the obtained set of metadata with said fingerprint in said database, and adding the computed fingerprint and the obtained set of metadata, associated with the computed fingerprint to the database;
    determining a definite set of metadata associated with said fingerprint, wherein each element in said definite set of metadata is determined based on a number of corresponding elements in each set of the obtained set of metadata; and
    deleting sets of metadata other than said definite set of metadata from said database.

2. The method of claim 1, the step of including the fingerprint and the set of metadata comprising receiving the computed fingerprint and the obtained set of metadata in a server.

3. The method of claim 2, in which said definite set of metadata associated with a particular fingerprint is determined once a sufficient number of sets of metadata are associated with said particular fingerprint in the database.

4. The method of claim 3, further comprising supplying the definite set of metadata to at least one client from which a set of metadata associated with the particular fingerprint was previously obtained.

5. A file sharing peer-to-peer client arranged for updating a database comprising a fingerprint of and an associated set of metadata for each of a number of multimedia objects, comprising:
    means for obtaining a multimedia object and a set of metadata for the multimedia object over a network from a further file sharing peer-to-peer client connected to the network,
    computing a fingerprint from the multimedia object, and means for including the computed fingerprint and the obtained set of metadata in the database;
    determining a definite set of metadata associated with said fingerprint, wherein each element in said definite set of metadata is determined based on corresponding elements in each set of the obtained set of metadata; and
    deleting sets of metadata other than said definite set of metadata from said database.

6. A server arranged for updating a database comprising a fingerprint of and an associated set of metadata for each of a number of multimedia objects, comprising:
    networking means for receiving a computed fingerprint and a set of metadata;
    verifying means for determining whether the computed fingerprint is present in the database, and if so, associating the obtained set of metadata with said fingerprint, and if not, adding the computed fingerprint and the obtained set of metadata, associated with each other, to the database:
    filtering means for determining a definite set of metadata associated with said fingerprint, wherein each element in said definite set of metadata is determined based on corresponding elements in each set of the obtained set of metadata; and
    deleting sets other than said definite set of metadata from said database.

7. The server of claim 6, wherein said definite set of metadata associated with a particular fingerprint is determined once a sufficient number of sets of metadata are associated with said particular fingerprint in the database.

8. The server of claim 7, further-comprising:
    means for supplying the definite set of metadata to at least one client from which a set of metadata associated with the particular fingerprint was previously obtained.

* * * * *